April 8, 1958    H. KOWALSKI ET AL    2,829,531
VARIABLE SPEED TRANSMISSION

Filed Nov. 26, 1951                    2 Sheets-Sheet 1

INVENTOR
HERBERT KOWALSKI
HANS STRÖTER
BY Toulmin & Toulmin
ATTORNEY.

April 8, 1958 H. KOWALSKI ET AL 2,829,531
VARIABLE SPEED TRANSMISSION
Filed Nov. 26, 1951 2 Sheets-Sheet 2

INVENTOR
HERBERT KOWALSKI
HANS STRÖTER
BY
ATTORNEY:

United States Patent Office 2,829,531
Patented Apr. 8, 1958

2,829,531

VARIABLE SPEED TRANSMISSION

Herbert Kowalski and Johann Philipp Ströter, Dusseldorf, Germany; said Kowalski assignor to said Ströter Application November 26, 1951, Serial No. 258,242

2 Claims. (Cl. 74—193)

This invention is concerned with infinitely variable change speed gears and has for its object to provide a gear which is of simple resistant construction, has small space requirements, is very simple in operation, has a large range of adjustment and oscillation-free, noiseless, running.

The invention is based on a system of fixed and axially displaceable bevel wheels or cones between which the power transmission takes place by means of endless transmission members, such as friction rings, friction wheels, V-belts, linked V-belts, linked chains and the like. In the known infinitely variable gears of this type, which have, for example, V-belts as transmission members, considerable changes in the load, especially upon reduction of the speed, cause a considerable drop in output, thereby causing objectionable oscillations.

According to the present invention, with a variation of the torque at the driven shaft, a lever, a rocking member, a pivoted arm, rotatable about a fixed point on the casing of the gear, or the like, is automatically actuated in response to the said changes in load on the gear, said lever or the like engaging an intermediate shaft of the gear and, by its movement, positively causing this shaft with its bevel wheels to be so moved relative to the shafts which are fixedly and invariably mounted in the casing, that the frictional pressure on the transmission members, for example, the friction rings, is adjusted in a fully automatic manner to the changed load without occurrence of slip and losses.

A gear constructed on this basis can be employed with a fixed transmission range and also in conjunction with supplementary switching arrangements, gearings, and the like which serve to amplify the range of transmission.

A gear constructed in accordance with the invention is shown diagrammatically and, by way of example, in the accompanying drawings, wherein.

Figure 1:
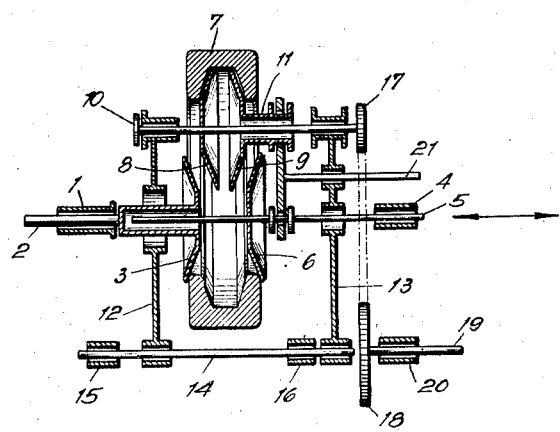
Figure 1 shows a gear unit according to the invention in longitudinal section, said unit being shown diagrammatically.

According to Figure 1, the driving shaft 2 is rotatably mounted in the bearing 1 of the casing; said shaft supports a conical disc 3 on its hollow end. Mounted for rotation and axial displacement in the bearing 4 of the casing is a shaft 5, the free end of the latter being received in the hollow section of the shaft 2. The shaft 5 carries a conical disc 6. A friction ring 7 is gripped on the outside by the conical discs 3, 6, and on the inside, by conical discs 8, 9. The conical disc 8 is fast on a shaft 10 and the conical disc 9 is fast on its hub 11. The conical disc 9, with its hub 11, is arranged to be displaceable on the shaft 10 by means of a longitudinal keyway (not shown).

The shaft 10 is rotatably mounted in arms 12, 13, which are rotatably mounted on a rod 14 and do not come into contact with the shafts 2 and 5. The rod 14 is mounted in bearings 15, 16 in the casing. The shaft 10 carries at one of its ends, for example, a chain wheel 17, which is coupled by means of a chain to a chain wheel 18. The latter is fast on the driving shaft 19 which is rotatably arranged in a bearing 20 in the casing and, preferably, in axial alignment with rod 14.

By means of a shifter member 21, the conical disc 9 with its hub 11 and the conical disc 6 with its shaft 5 can be displaced axially in unison and to the same extent so that the friction ring 7 is moved by actuating the shifter member to different diameters of the conical discs and there is thus effected a change in the driven speed.

Figure 2:
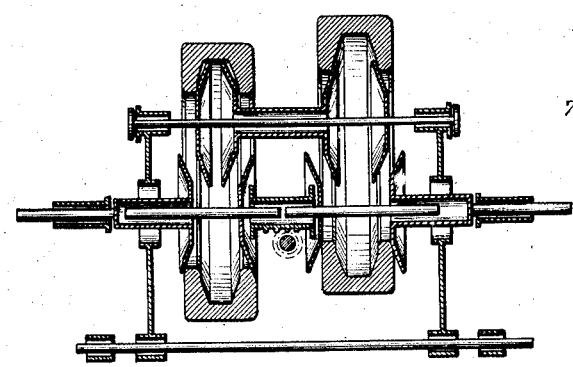
Figure 2 shows a gear comprising two units in accordance with Figure 1.

Figure 2 is a diagrammatic representation of a gear which has been well tested in practice and which has two friction rings. This construction has the advantage that a condition of absolute equilibrium obtains within the gear, particularly with regard to the axial thrusts on the cones, so that the changing of the speed ratio of the gear can be carried out without any self-braking arrangement.

Figure 3:
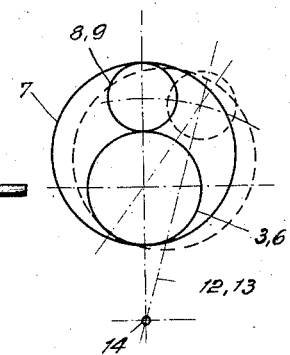
Figure 3 shows diagrammatically the variation in the frictional pressure on the transmission rings upon pivoting of the balancing lever.

Figure 3 shows diagrammatically the automatic regulation of the operative engagement of the cones and friction ring according to this invention. The circles represent the diameters of the conical discs 3, 6 and 8, 9, on which is effected the driving of the bearing surfaces of the friction ring 7. The conical discs 3, 6 are mounted on an axis fixed in the casing. The conical discs 8, 9 are, however, mounted in the lever system 12, 13. The lever system 12, 13 is arranged to pivot about the rod 14. Upon a load being applied to the gear, the system endeavors to reach the dotted position with a corresponding increase of the spacing of the axes of the two sets of conical discs. The deflection is limited by the rigidity of the friction ring.

This system ensures a fully automatic control of the surface pressure by the torque to be transmitted while preventing slipping. Since the lever system is normally in a neutral position and can be deflected either to the left or to the right, a gear constructed in accordance with the principles of this invention is equally suitable for either direction of rotation of the driving and driven shafts. It will be noted that the tendency of the system described is always for the plane containing the axes of the driving cones to contain the axis of the friction ring, whereby the cones are positioned diametrically opposite each other within the ring.

Figure 4:
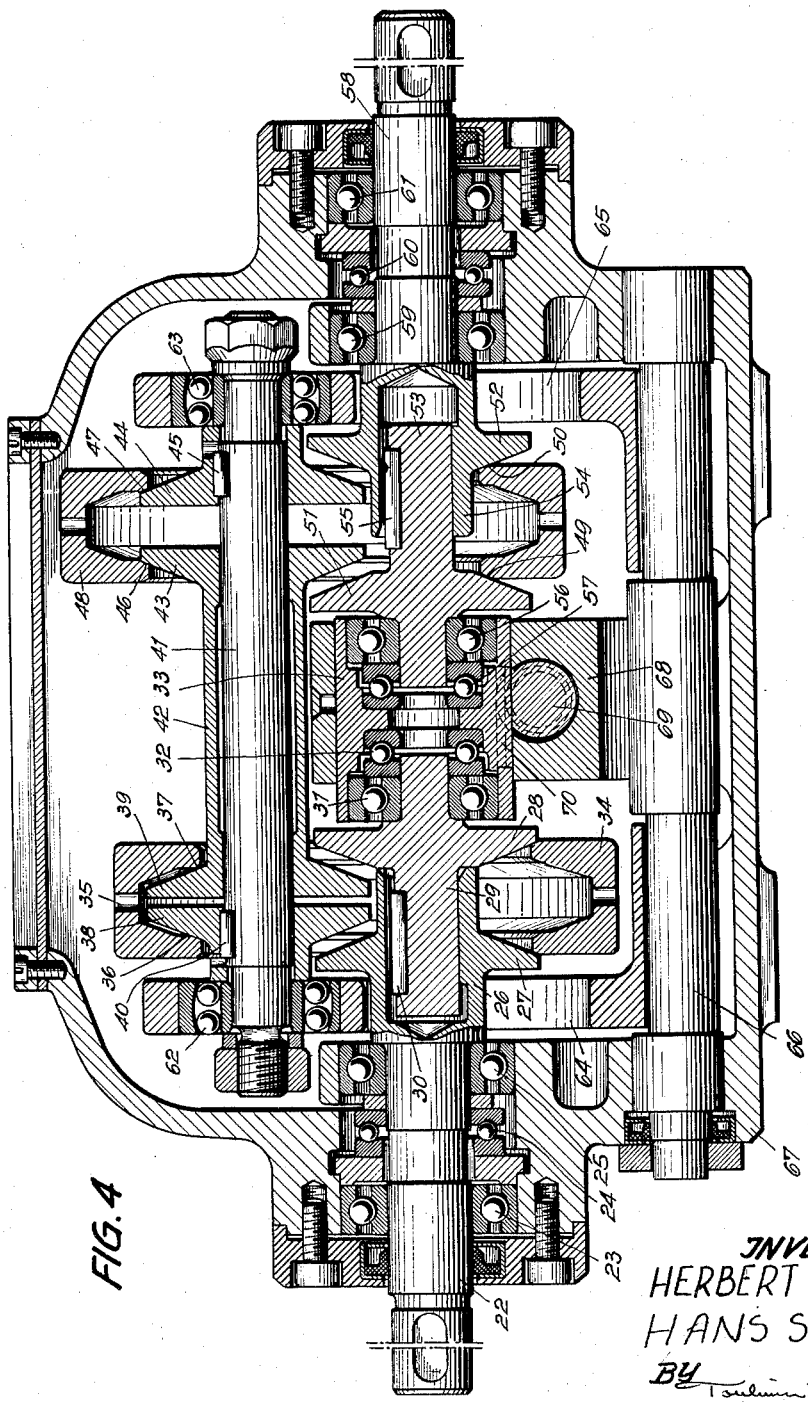
Figure 4 shows a practical embodiment of the infinitely variable gear according to Figure 2 in longitudinal section.

Figure 4 shows a constructional example of the gear, which is diagrammatically shown in Figure 2. A conical disc 28 is driven from the driving shaft 22, which runs in ball bearings 23, 25, and has a thrust bearing 24, by means of its hollow end section 26 which carries a conical disc 27. The shaft 29 of the disc 28 is mounted at one end by means of a longitudinal key 30 so as to be axially displaceable but non-rotatable in the hollow end section 26 of the driving shaft 22, and at the other end in ball bearing 31, and thrust bearing 32 in an axially displaceable bearing block or brush 33.

The conical discs 27, 28 grip a friction ring 34, which is formed with apertures 35 for the discharge of used lubricant. The friction ring 34 transmits its movement by means of its conical inside faces 36, 37 to conical discs 38, 39, of which the disc 38 is secured by a key 40 to a shaft 41, while the disc 39 is displaceably arranged on the shaft 41. It has been shown in practice that it is not necessary to secure the disc 39 for longitudinal displacement on the shaft 41 by a key, but that it can be arranged to move freely on the shaft 41 without detrimental effect on the transmission of energy, since it automatically assumes the same angular speed as the said shaft. A key, can, of course, be used, if desired.

Connected with the disc 39 is a sleeve 42 which carries a second conical disc 43 to which, as counter-weight, corresponds a further conical disc 44 which is keyed at 45 to the shaft 41.

Both discs 43 and 44 act on the conical inside faces 46, 47 of a friction ring 48, the movement of which is transmitted by its conical outer faces 49, 50 to a pair of conical discs 51, 52. The conical disc 51 is mounted for longitudinal displacement, but without rotation, by its shaft 53 in the hollow neck 54 of the conical disc 52 by means of a key 55. The other end of the shaft 53 runs in ball bearing 56 and thrust bearing 57.

The conical disc 52 is rigidly connected with the driven shaft 58 which also runs in ball bearings 59, 61, and thrust bearing 60.

The automatic adaption of this gear to fluctuations in the load is effected by means of the special mounting and adjustment of the intermediate shaft 41. This shaft 41 is mounted in the self-aligning ball bearings 62, 63 arranged in pivoted arms 64, 65 which can execute a swinging movement about a shaft 66 which is mounted in the casing 67 of the complete gear. The eccentric construction of the shaft 66 represented by the offset spindle portions that are engaged by the ends of arms 64, 65, facilitates assembly and offers the possibility of adjustment to the gear.

Fixedly connected with the casing 67, while spaced from the shaft 66 is a pillar 68 having a bore in which the sliding bearing block or bush 33 can be reciprocated in the direction of its axis by means of a pinion 69 and a rack 70.

By means of such an adjustment of the sliding block or bush 33 in one or the other direction, the conical openings between the discs 27, 28 and between the discs 51, 52 are adjusted. The conical discs 39, 43 with their common sleeve 42 are then positively displaced on the intermediate shaft 41 by means of the friction rings 34, 48. In this manner, the engaging surfaces of the friction rings 34 and 48 are shifted radially with respect to the axis of the said conical discs, so that thereby the peripheral speed and the transmission ratio is varied.

As shown in Figure 4, a gear according to this invention is enclosed in a case and the case is at least partly filled with oil so all parts are running in an oil bath.

The infinitely variable gear which has been described offers the following advantages:

It can be made entirely of metal so that in all of its parts the transmission takes place between metal surfaces so that wear can be reduced to the smallest possible amount. The gear made entirely of metal can run in an oil bath so that practically noiseless running with maximum efficiency is ensured.

A particular advantage consists in that, on account of the oscillatable arrangement of the intermediate shaft 41, the gear is automatically adapted to variations in the load in all transmission ratios and in both directions of operation. It is, therefore, possible to operate the gear at relatively low driving speeds, for example, at a speed of about 400 R. P. M., as compared with the speed of an average of 1000 R. P. M., which has hitherto been usual with such gears. In this way speeds are obtained on the output side which can be used directly without interposition of a supplementary reduction gear. Combined with this, there is the exceptionally large regulation range of the new gear. For example, with a given driving speed, the driven speed with the construction of Figure 4, can be increased to 3.16 times ($\sqrt{10}$), and also reduced by 3.16 times ($\sqrt{10}$), so that the complete adjustment range corresponds to the ratio 1:10. By suitable design of the conical form of the discs and the friction rings, the range of adjustment can also be extended to a ratio of 1:20 or higher.

As regards the operation of the new gear, it is further to be noted that this not only transmits a constant torque, but also a constant output, this effect being produced throughout the entire range of adjustment. Therefore, if the driving power is for example 4 H. P., a corresponding output is transmitted at both the highest and the lowest speeds of the power take-off shaft.

The constructional form of the invention described above can be modified without departing from the scope of the invention as defined in the following claims. In the construction described, for instance, by the aid of pivotable arms, e. g. 12, 13 according to Figure 3 or 64, 65 according to Figure 4, the distance between the conical discs in the axial direction can be changed. The same result could also be obtained by means of other elements designed to operate in a similar way, for example, by allowing the shaft 41, together with the conical discs, to slide over a cam so that the conical discs in axial direction make the same movement as under the influence of the said pivotable arms.

It will be understood that this invention is susceptible to modification in order to adapt it to different usages and conditions, and, accordingly, it is desired to comprehend such modifications within this invention as may fall within the scope of the appended claims.

We claim:

1. In a variable speed transmission of the type described, a casing, an input shaft extending into the casing at one side and an output shaft in axial alignment therewith extending into the casing from the opposite side, said shafts being rotatable in the casing but being held therein against axial movement, each said shaft having a bevel drive member fixed thereto, a second bevel drive member keyed to the inner end of each shaft and axially slidable thereon, stub shafts projecting inwardly from the inner side of each of the last-mentioned bevel drive members, a bearing block between the last-mentioned drive members having bearing means therein for journaling the said stub shafts while preventing relative axial movement therebetween, means rigid with the casing supporting said block and providing for movement thereof axially of said input and output shafts thereby to vary the spacing of said bevel drive members on the shafts, an intermediate shaft within the casing, two pairs of bevel members on the intermediate shaft, and friction rings engaging the respective pairs of bevel drive members on the input and output shafts, and each ring also engaging one of the pairs of bevel members on the intermediate shaft.

2. In a variable speed transmission of the type described, a casing, an input shaft extending into the casing at one side and an output shaft in axial alignment therewith extending into the casing from the opposite side, said shafts being rotatable in the casing but being held therein against axial movement, each of said shafts having a first bevel driving member fixed thereto, a second bevel driving member keyed to the inner end of each shaft and axially slidable thereon, stub shafts projecting inwardly from the inner side of each of said second bevel driving members, a bearing block between said second bevel driving members having bearing means therein for journaling said stub shafts while preventing relative axial movement therebetween, means rigid with the casing supporting said block and providing for movement thereof axially of said input and output shafts thereby to vary the spacing of the bevel driving members on the shafts, an intermediate shaft within the casing, two pairs of bevel members on the intermediate shaft, the one pair of said bevel members on said intermediate shaft being the driving one and the second pair thereof being the driven one and each pair comprising one member fixed on said intermediate shaft and one member slidable on said intermediate shaft, said slidable members being connected to slide on said intermediate shaft in unison, and friction rings engaging the respective pair of first and second bevel driving members on the input and output shafts each with one of the pairs of bevel members on the intermediate shaft.

References Cited in the file of this patent

UNITED STATES PATENTS

| | | |
|---|---|---|
| 1,185,952 | Sundh | June 6, 1916 |
| 1,574,620 | Gill | Feb. 23, 1926 |
| 1,623,052 | Garrard | Apr. 5, 1927 |
| 1,950,675 | Heynaw | Mar. 13, 1934 |
| 2,089,295 | Pollard | Aug. 10, 1937 |
| 2,441,276 | Kuner | May 11, 1948 |
| 2,480,968 | Ronai | Sept. 6, 1949 |

FOREIGN PATENTS

| | | |
|---|---|---|
| 1,012,440 | France | Apr. 16, 1952 |
| 702,915 | Germany | Feb. 19, 1941 |
| 372,304 | Italy | June 23, 1939 |